(12) United States Patent
Michel et al.

(10) Patent No.: US 10,102,145 B1
(45) Date of Patent: Oct. 16, 2018

(54) OUT OF ORDER LBA PROCESSING

(71) Applicant: Seagate Technology LLC, Cupertino, CA (US)

(72) Inventors: Richard P Michel, Minneapolis, MN (US); Mark A Gaertner, Vadnais Heights, MN (US); Kevin Nghia Dao, Apple Valley, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/961,762

(22) Filed: Dec. 7, 2015

(51) Int. Cl.
*G06F 12/109* (2016.01)
*G06F 3/06* (2006.01)
*G06F 11/10* (2006.01)

(52) U.S. Cl.
CPC ............ *G06F 12/109* (2013.01); *G06F 3/064* (2013.01); *G06F 3/0619* (2013.01); *G06F 3/0656* (2013.01); *G06F 3/0673* (2013.01); *G06F 11/1076* (2013.01); *G06F 2212/1008* (2013.01); *G06F 2212/657* (2013.01)

(58) Field of Classification Search
CPC ...... G06F 12/109; G06F 3/0619; G06F 3/064; G06F 3/0656; G06F 3/0673; G06F 11/1076; G06F 2212/1008; G06F 2212/657
See application file for complete search history.

(56) References Cited

U.S. PATENT DOCUMENTS

| | | | |
|---|---|---|---|
| 6,862,151 B2 | 3/2005 | Hoskins et al. | |
| 8,060,707 B2 | 11/2011 | Fairhurst et al. | |
| 8,760,986 B2 | 6/2014 | Reddy et al. | |
| 9,019,640 B2 | 4/2015 | Reddy et al. | |
| 9,153,287 B1* | 10/2015 | Hamilton | G11B 27/3027 |
| 2003/0061552 A1* | 3/2003 | Su | G11B 20/1816 |
| | | | 714/708 |
| 2003/0177434 A1* | 9/2003 | Su | G11B 20/1816 |
| | | | 714/768 |
| 2007/0279789 A1 | 12/2007 | Smith et al. | |
| 2012/0317365 A1* | 12/2012 | Elhamias | G06F 12/0862 |
| | | | 711/141 |
| 2015/0098271 A1* | 4/2015 | Lasser | G11C 7/1006 |
| | | | 365/185.11 |

* cited by examiner

*Primary Examiner* — Kyle Vallecillo
(74) *Attorney, Agent, or Firm* — Cesari & Reed, LLP; Kirk A. Cesari; Christian Best

(57) ABSTRACT

Systems and methods are disclosed to perform out of order LBA processing at a data storage device. A data storage device may be configured to receive a read command including a sequential LBA range, read data for the LBA range in non-sequential order and store the data to a buffer, and return the data to the host in sequential LBA order. The storage device may begin a read operation at a sector in the middle of the LBA range, and read the beginning of the LBA range on a next rotation of the media. The storage device may note the location of read errors without interrupting a read operation. Successfully read data may be buffered, while rereads and error recovery may be performed only on LBAs at which errors were encountered. Once the data from the LBA range has been acquired, the data may be organized into sequential order.

17 Claims, 8 Drawing Sheets

OUT OF ORDER LBA PROCESSING

SUMMARY

In certain embodiments, an apparatus may comprise a processor configured to receive, from a host, a read command including a sequential LBA range corresponding to a set of physically sequential data sectors, read data from the data sectors in non-sequential order and store the data to a buffer, and return the data to the host in sequential LBA order.

In certain embodiments, a memory device may store instructions that, when executed, cause a processor to perform a method comprising receiving, from a host, a read command including a sequential LBA range corresponding to a set of physically sequential data sectors, reading data from the data sectors in non-sequential order and storing the data to a buffer, and returning the data to the host in sequential LBA order.

In certain embodiments, a method may comprise receiving, from a host, a read command including a sequential LBA range corresponding to a set of physically sequential data sectors, reading data from the data sectors in non-sequential order and storing the data to a buffer, and returning the data to the host in sequential LBA order.

DETAILED DESCRIPTION

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a processor or controller device. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Figure 1:
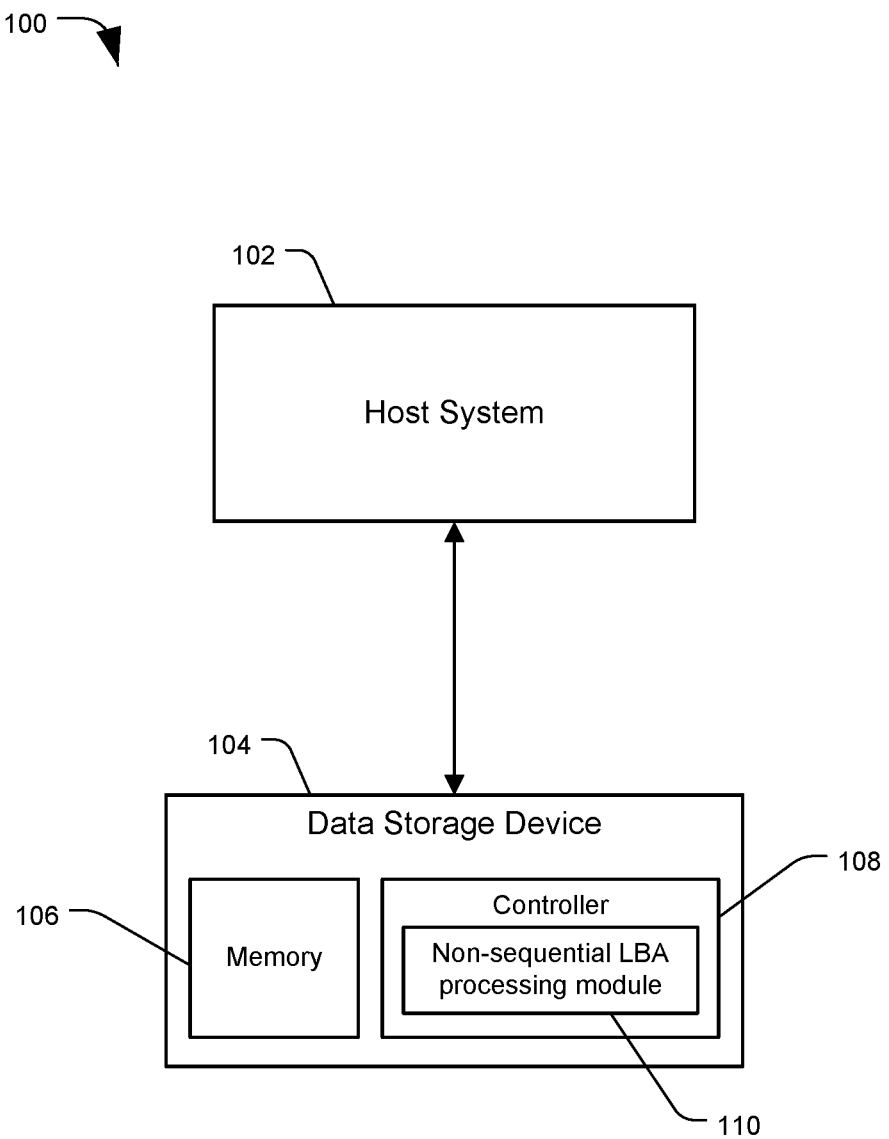
FIG. 1 is a diagram of a system configured to perform out of order logical block address (LBA) processing, in accordance with certain embodiments of the present disclosure.

FIG. 1 is a diagram of a system 100 configured to perform out of order logical block address (LBA) processing, in accordance with certain embodiments of the present disclosure. The system 100 may include a host 102 and a data storage device (DSD) 104. The host 102 may also be referred to as the host system or host computer. The host 102 can be a desktop computer, a laptop computer, a server device, a tablet computer, a telephone, a music player, another electronic device, or any combination thereof. Similarly, the DSD 104 may be any of the above-listed devices, or any other device which may be used to store or retrieve data, such as a disc drive, solid state drive, hybrid drive, or any combination thereof. The host 102 and DSD 104 may be connected by way of a wired or wireless connection, including by a local area network (LAN) or wide area network (WAN). In some embodiments, the DSD 104 can be a stand-alone device not integrated into a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise one or more circuits or processors configured to control operations of the data storage device 104, such as storing data to or retrieving data from the memory 106. The DSD 104 may receive a data read or write request from the host device 102, and use the controller 108 to perform data operations on the memory 106 based on the request.

Data may be stored to memory 106, for example in units of physical storage locations (sometimes referred to as "sectors" or "data sectors"). A sector may be configured to store a sequence of bits or bytes of a fixed size sometimes referred to as a "block." In some embodiments, data sectors may be associated with particular LBAs (logical block addresses), based on the logical addresses used to reference the data stored to a sector. Sectors may be statically mapped to LBAs, with a particular LBA corresponding to a particular sector, barring an LBA being remapped to a different sector due to a defect rendering a first sector unreliable. Sequential LBAs may therefore correspond to physically sequential sectors of the memory 106. For example, the LBA range 1 to 10 may correspond to ten consecutive physical sectors of the memory 106.

In some embodiments, DSD 104 may be configured to read LBAs in sequential order. For example, when receiving a read command from the host 102 to read data corresponding to LBAs 1 through 10, the DSD 104 may begin reading at LBA 1 and continue reading through LBA 10. In the case of a rotating media memory, such as a hard disc, reading a sequential LBA range may include positioning a read head over a target data track and waiting until the start of the LBA sequence passes under the head to being the reading operation. If a read error is encountered during the read operation which the DSD 104 cannot recover quickly, the DSD 104 may halt read operations until the read error is recovered before proceeding to read sectors following the error. Error recovery operations may require multiple disc revolutions to perform read retries, or other slow recovery operations. If multiple errors are encountered during the course of a sequential read, the DSD 104 may halt the read upon encountering each error in order to perform error recovery operations for that error. For example, a read command may direct the DSD 104 to read the data from a selected data track. The DSD may move the read head to the selected data track and wait to begin the read operation until the disc revolves to position a first sector under the read head. If a first error is encountered, the DSD 104 may halt the read operation until the disc revolves enough to perform a second read attempt at the error location. If the read retry succeeds, the DSD 104 may continue reading until a second error is encountered. The DSD 104 may once again pause the read operation for another revolution of the disc to attempt another read retry before proceeding with the read, and so on. The example above may require three or more disc revolutions to complete the read operation in addition to the time required to position the read head over the first sector of the sequence.

In some embodiments, the DSD 104 may be configured to perform out of order LBA processing. The DSD 104 may be configured to read a sequential set of LBAs in non-sequential order. The DSD 104 may be configured to reorganize the LBAs into sequential order once each LBA from the sequence has been read, for example in order to return requested data to the host 102 in sequential order. Out of order LBA processing may improve the time to complete read operations, thereby improving the input/output operations per second (IOPS) for the DSD 104.

Accordingly, DSD 104 may include a non-sequential LBA processing module (NLPM) 110. A "module" may be one or more physical components of a computing device (e.g., circuits) configured to perform a particular task or job, or it may be a program that, when executed, causes a processor to perform the particular task or job. The NLPM 110 may control the operations of DSD 104 directed to out of order LBA processing.

The NLPM 110 may allow the DSD 104 to begin reading a set of sequential LBAs at any point, and not be limited to starting with a first LBA of the sequence and continuing in order through the last LBA of the sequence. For example, a disc-based DSD 104 may receive a read command from the host 102 to read LBAs 1 through 10. The NLPM 110 may calculate a first LBA in the set of LBAs that can be reached by the read head and read, based on the current head position, disc rotation speed, other factors, or any combination thereof. In the example embodiment, the NLPM 110 may determine that the head can be relocated over the target track in time to read LBA 7. The NLPM 110 may control the head to move to the target track and read LBAs 7 through 10, and store the corresponding data to a read buffer. Once the disc has revolved enough to position the read head over LBA 1, the NLPM 110 may control the head to read LBAs 1 through 6, and store the data to the read buffer. The NLPM 110 may then reorganize the data from the buffer, returning the data to the host 102 in sequential order, from LBA 1 to LBA 10.

The NLPM 110 may allow the DSD to efficiently perform error recovery operations for read errors. For example, the NLPM 110 may control the DSD 104 to continue read operations uninterrupted, even if an error is encountered. The NLPM 110 may store a list or indication of sectors at which errors were encountered. After the initial read operation has completed for the non-error sectors, the NLPM 110 may perform a subsequent read operation to attempt to recover all of the remaining errors. A system for out of order LBA processing is described in further detail in regard to FIG. 2.

Figure 2:
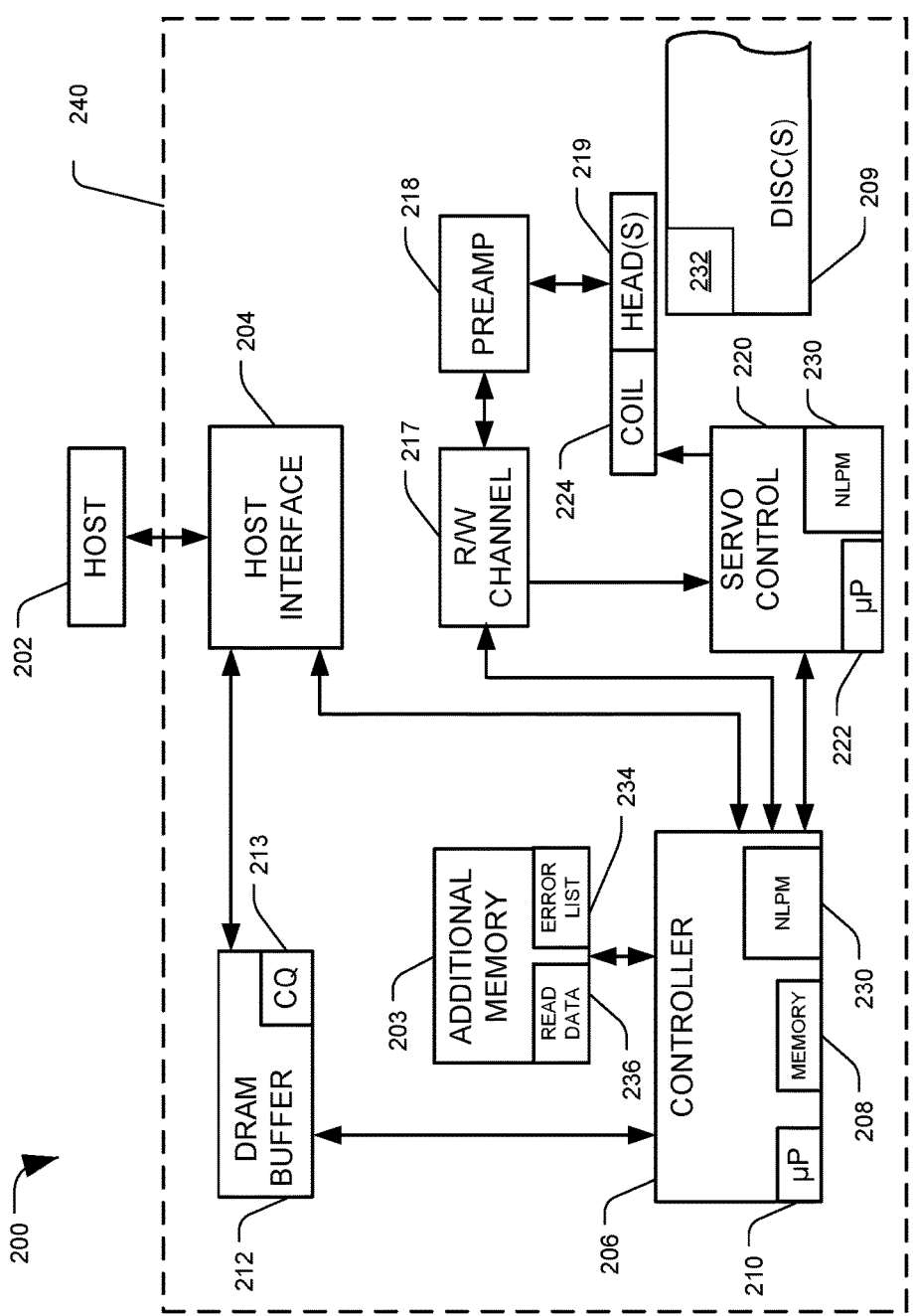
FIG. 2 is a diagram of a system configured to perform out of order LBA processing, in accordance with certain embodiments of the present disclosure.

FIG. 2 is a diagram of a system configured to perform out of order LBA processing, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component. Data read during read commands may be stored in the buffer 212, or to another memory of the DSD 200, pending transmission to the host 202.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

The DSD 200 may include other types of memory instead of or in addition to disc memory 209. For example, the DSD 200 can include an additional memory 203, which can be either volatile memory such as dynamic random-access memory (DRAM) or static random access memory (SRAM), or non-volatile memory, such as NAND Flash memory. In some embodiments the additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include a non-sequential LBA processing module (NLPM) 230, which may correspond to NLPM 110 of FIG. 1. The NLPM 230 may manage out of order LBA processing for the DSD 200. The NLPM 230 may be a processor, controller, or other circuit, or it may be a set of software instructions that, when executed by a processing device, perform the functions of the NLPM 230. The NLPM 230 may be part of or executed by controller 206, part of or executed by servo control circuit 220, distributed between multiple components of the DSD 200, or a standalone component of the DSD 200 and not included in another component.

The DSD 200 may receive a read command from the host 202 via the host interface 204. The host 202 may send a read command to retrieve specified data corresponding to a logical block address (LBA) range included with the read command. The DSD 200 may attempt to read the specified data from the discs 209. To execute the read, the DSD 200 may determine data sectors 232 on the discs 209 corresponding to the LBA range received from the host 202, such as by using an address mapping table stored at the DSD 200. If the requested LBA range includes sectors on more than one data track, the DSD 200 may split the read command into multiple read operations, with one read operation per track. Alternately, the DSD 200 may perform a multi-track read operation without splitting the read command into smaller operations.

The NLPM 230 may determine an LBA from the LBA range which the head 219 can reach first. For example, when the read operation begins, the head may be situated near an inner diameter of the disc 209. The NLPM 230 may determine a target track having LBAs from the LBA range that is nearest to the current position of the head 219, and may determine which sector of the target track the head will first be able to read upon arriving at the target track. If the first sector available to read corresponds to an LBA from the LBA range, the NLPM 230 may initiate the read operation immediately. Accordingly, the read operation may begin in the middle of the LBA range. The beginning of the LBA range may then be read once this disc has spun around. If the first sector available to read is not within the LBA range, the NLPM may delay the read operation until the head 219 reaches an LBA from the LBA range. Data that is successfully read during the read operation may be stored or buffered as read data 236, such as at memory 203 or buffer 212. The read data 236 may be stored in non-sequential order, depending on where the read operation began, how many read operations the read command was divided into, errors encountered during the read, or other factors. The NLPM 230 may maintain a list or table along with the read data 236 to track the order in which the read data 236 was stored, in order to reorganize the data into sequential order before transfer to the host 202. If the read command was divided into multiple read operations, the NLPM 230 may proceed to a next read operation corresponding to a target track having sectors from the LBA range after completing the current read operation.

During the read, the DSD 200 may encounter an error when attempting to read the specified data. A read error may occur when the DSD 200 is unable to decode the signal read from the data sector 232 without interrupting the read, when a read fault occurs due to the head 219 deviating from the target track, or due to other factors. If a read error is encountered during a read operation, the LBA or sector corresponding to the read error may be added to an error list 234, and the read operation may continue without interruption to read the remaining LBAs from the LBA range. The error list 234 may be stored to a memory such as memory 203, memory 208, or buffer 212. In an example embodiment, while reading the LBA range 1 through 10 in sequence, errors may be encountered at LBAs 2 and 7. LBAs 2 and 7 may be added to an error list 234, while the rest of the LBAs may all be read during a single read operation. The successfully read sectors may be added to a read data 236 buffer in the sequence 1, 3, 4, 5, 6, 8, 9, 10. After completing the first read operation, the NLPM 230 may use the error list 234 to generate a second read operation including the error sectors, such as by using a read mask. A read mask may include a register having a bit or entry for each sector in a sequence, with each entry indicating whether to transfer data for that sector. The second read operation may successfully read and decode sectors 2 and 7, which may be stored to read data 236. Read data 236 may therefore be buffered in the order 1, 3, 4, 5, 6, 8, 9, 10, 2, 7.

In some embodiments, the error list may comprise the read mask. As each sector is read, the NLPM 230 may store a '0' bit value to the mask register for each sector successfully read, and a '1' bit value for each sector at which an error was encountered. After performing a first read, a non-zero register value may indicate that errors were encountered. The NLPM 230 may execute a second read operation using the read mask, with data only being transferred for the sectors having a '1' bit value.

The NLPM 230 may employ other methods to address read errors using out of order LBA processing. One approach may be to reconstruct data from marginal sectors (e.g. where errors were encountered) using parity or super parity data. Parity data may be metadata stored to one or more memories which, when run through the proper algorithms, allows the reconstruction of corrupted or unreadable data. In a particular implementation, a track-based recovery system may include parity data stored to a data track which may be used to reconstruct data for sectors on that track. For example, a portion of parity data for a track may be stored to each sector of a track. With the parity data from enough sectors, a DSD 200 may reconstruct the data from any given marginal sector. In some embodiments, parity data may be stored to other parts of the memory than on a track-by-track basis, or even at other storage devices. The NLPM 230 may attempt to reconstruct the data from marginal sectors using parity data instead of or in addition to attempting re-read attempts at the marginal sectors. In the example above, after encountering errors at LBAs 2 and 7, the NLPM 230 may attempt to reconstruct the data from those sectors using parity data. The NLPM 230 may generate a read operation to read parity data from every sector of the target track except the marginal sectors, and use parity data to reconstruct the data from LBAs 2 and 7. The NLPM 230 may not need to re-read the sectors from the target track that were already successfully read, stored as read data 236. Once the LBAs 2 and 7 have been reconstructed, they may be stored to read data 236.

The above-described techniques can be executed in any combination. For example, the NLPM 230 may begin a read operation in the middle of an LBA range based on where in the range the read head arrives and can begin reading data. While reading the end of the LBA range, the DSD 200 may encounter read errors, the locations of which may be added to the error list 234 without interrupting the read operation. When the last LBA in the sequence is read, reading may pause until the beginning of the LBA range can be read, completing the first read operation. The errors may then be read during a second read operation, which may initiate in the middle of the LBA range once again.

The data requested in a read command may be read and stored to a buffer out of sequential order as read data 236. The NLPM 230 may then arrange the read data 236 into sequential order (e.g. LBA 1 through LBA 10) and return the data to the host 202. A method of out of order LBA processing is described in regard to FIG. 3.

Figure 3:
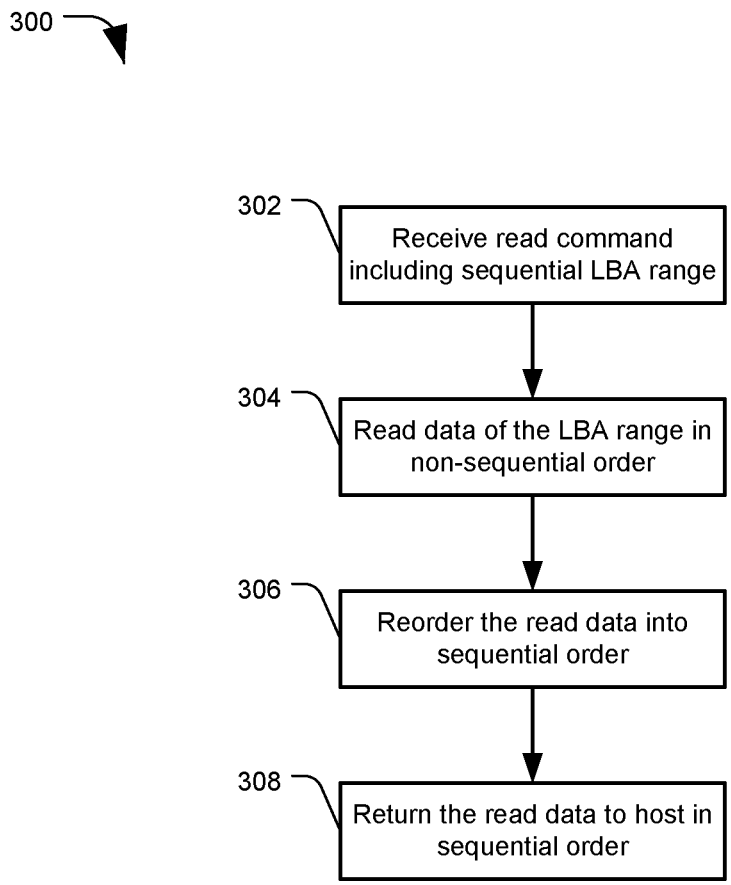
FIG. 3 is a flowchart of a method of out of order LBA processing, in accordance with certain embodiments of the present disclosure.

FIG. 3 is a flowchart of a method 300 of out of order LBA processing, in accordance with certain embodiments of the present disclosure. The method 300 may be performed by a data storage device, such as DSDs 104 and 200 of FIGS. 1 and 2, respectively.

The method 300 may include receiving a read command, including a sequential LBA range for the requested data, from a host device, at 302. Based on the read command, the DSD may read the data corresponding to the LBA range in non-sequential order, at 304. For example, the read operation may begin at an LBA in the middle of the LBA range, resulting in the second half of the LBA range being read before the first half. In another example, the LBA range may be read out of order due to certain LBAs from the range being deferred due to errors. Read data may be stored to a read buffer in the order in which it was read, reconstructed, or otherwise obtained.

Once the requested data has been read and buffered, the read data may be reordered into sequential order, at 306. The DSD may maintain a log, address map, or other list to determine the order in which the LBAs were buffered. The data may be extracted from the buffer in sequential LBA order regardless of the order in which they were buffered, and the sequentially-ordered data may be returned to the host in response to the read command, at 308. In some embodiments, the out-of-order buffered data may be extracted and rebuffered (e.g. in the same buffer or a different buffer) in sequential order, and then returned to the host, at 308. Another embodiment of out of order LBA processing is described in regard to FIG. 4.

Figure 4:
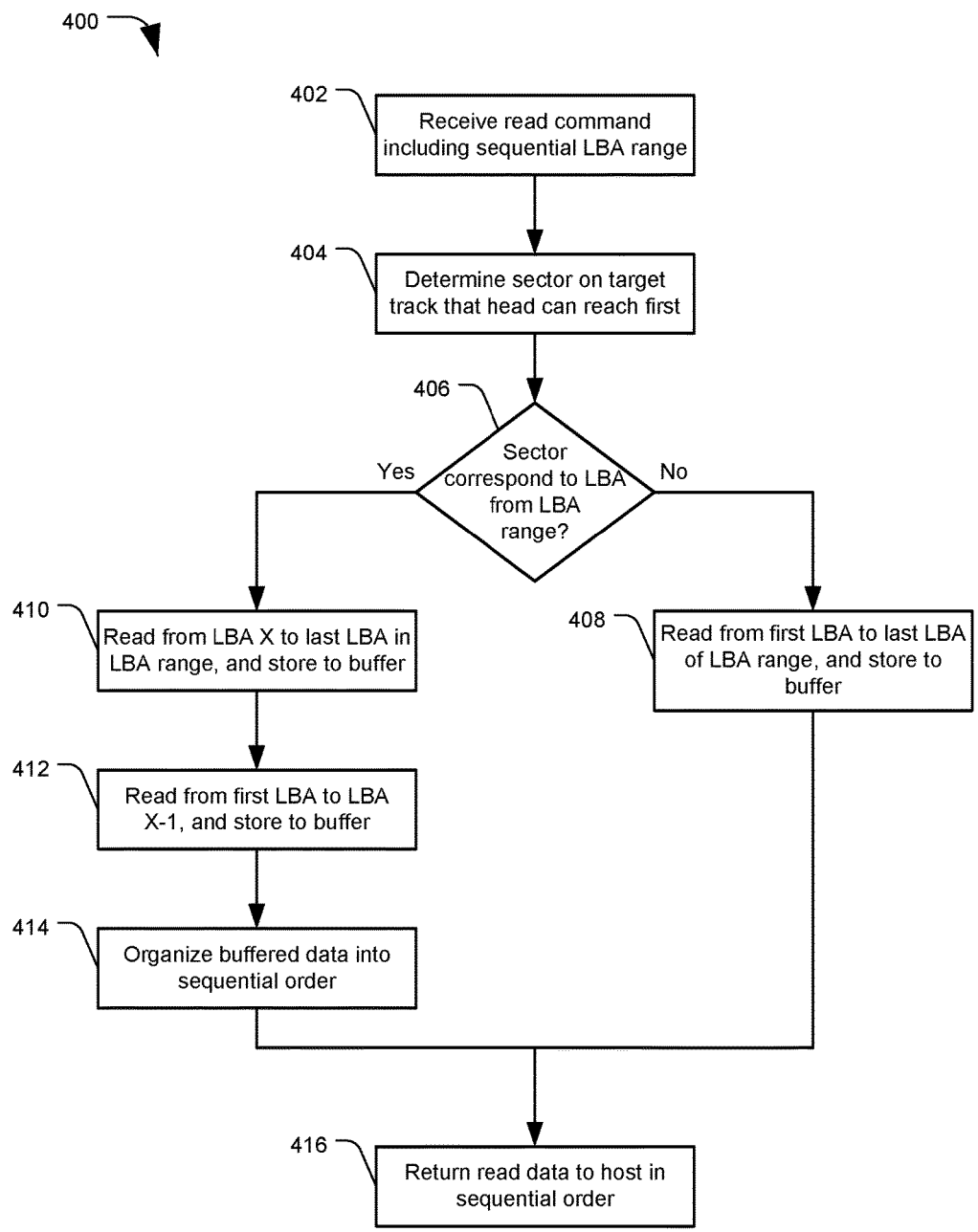
FIG. 4 is a flowchart of a method of out of order LBA processing, in accordance with certain embodiments of the present disclosure.

FIG. 4 is a flowchart of a method 400 of out of order LBA processing, in accordance with certain embodiments of the present disclosure. The method 400 may be performed by a data storage device, such as DSDs 104 and 200 of FIGS. 1 and 2, respectively.

The method 400 may include receiving a read command, including a sequential LBA range for requested data, from a host device, at 402. In response to the command, the DSD may determine a target track including LBAs from the read command, and may calculate what sector of the track the head will arrive at, at 404. For example, the DSD may determine the arrival sector based on the head moving at a maximum seek rate. The DSD may determine whether the first sector the head can read after arriving at the target track is one of the LBAs from the LBA range, at 406.

If the first sector the head can read does not correspond to an LBA from the LBA range, the method 400 may include moving the head to the target track and waiting until the disc spins so that an LBA from the LBA range is readable by the head. In such an embodiment, the head may begin reading at the first LBA in the range and continue reading through the last LBA in the range, and storing the data to a read buffer, at 408. In some embodiments, the head may begin reading before reaching the first LBA of the LBA range, including reading and caching data not requested by the host device. This speculative reading may cache data that the host device may request in a future read command, or the unrequested data can be used for error recovery operations in case of read errors encountered while reading the requested LBA range, e.g. using parity-based error correction techniques. Alternately, the data storage device may reduce the head seek speed so that the head arrives at the target track just in time to read the first LBA of the LBA range, rather than arriving early and waiting for the first LBA to pass under the head. Reducing the seek speed may reduce the power cost of the seek operation. In any event, the data from the requested LBA range may be read and stored in sequential order, and may not require any reordering.

If the first sector the head can read does correspond to an LBA from the LBA range, at 406, the method 400 may include initiating a read operation at that first sector, LBA X. The read operation may read data from LBA X to the last LBA in the LBA range, and store the data to the read buffer, at 410. The read operation may continue or resume once the first LBA from the LBA range can be read, and may read the first LBA through LBA X−1, and store the data to the read buffer, at 412. In some embodiments, the DSD may continue reading after the last LBA, including reading data not from the LBA range, until all data from the LBA range is read. For example, data outside the LBA range may still be stored to a cache as a read-ahead mechanism.

Once the entire LBA range has been read and buffered, the data may be organized into sequential LBA order, at 414. When the requested data is read and sequentially organized, at 414 or 408, the data may be returned to the host, at 416. For example, as data is read the data storage device may maintain a series of pointers indicating an order or position of the data within the buffer. Once the requested data are all buffered, the data storage device may extract the data from the buffer in sequential LBA order using the pointers, and return the data to the host. A diagram depicting an example embodiment of the out of order LBA processing of method 400 is shown in FIG. 5.

Figure 5:
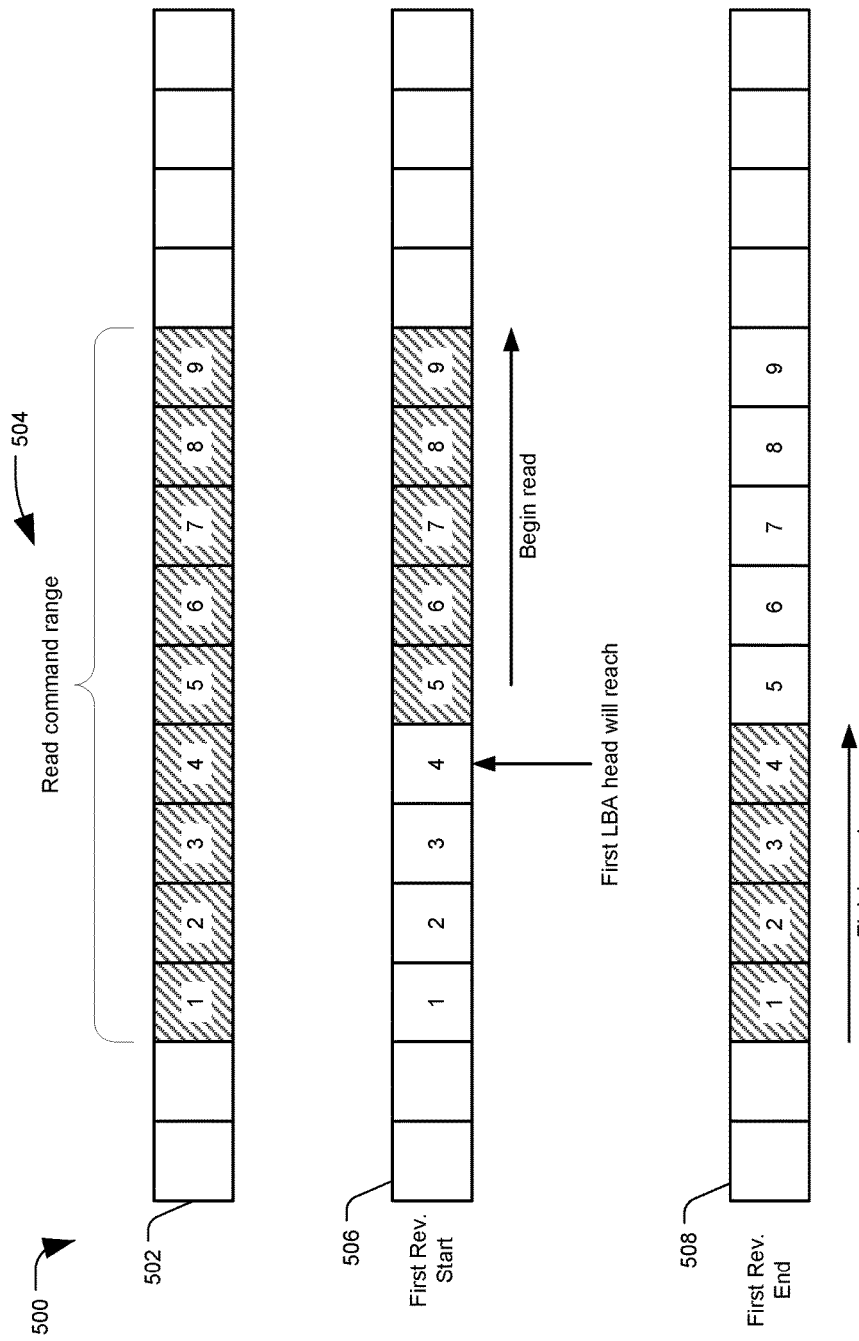
FIG. 5 is a diagram of storage sectors involved in a read command employing out of order LBA processing, in accordance with certain embodiments of the present disclosure.

FIG. 5 is a diagram 500 of storage sectors involved in a read command employing out of order LBA processing, in accordance with certain embodiments of the present disclosure. The diagram 500 may depict a section of a storage medium from a data storage device, such as the DSDs from FIGS. 1 and 2. Diagram 500 depicts a target data track 502 including an LBA range 504 requested in a read command. The track 502 includes a plurality of physical data storage sectors. A number of the sectors from target track 502 include data corresponding to the requested LBA range 504. The LBA range 504 includes example LBAs 1 through 9, depicted as sectors with hashing.

Upon receiving a read command, a DSD may determine a target track 502 including LBAs requested in the read command. The DSD may also determine a first sector a read head can reach at the target track 502, or a first LBA from the requested range 504 that the head can reach. In the depicted embodiment, the head may reach the target track 502 at LBA 4. The head may not be able to fully read a sector until LBA 5. For example, the head may arrive at the target track 502 in the middle of LBA 4, and therefore may not be able to fully read LBA 4. The DSD may require time to activate a read gate and begin reading data, which may require delaying a read until the next sector. Other examples are also possible.

The DSD may begin reading at LBA 5, and sequentially read the following LBAs 5 through 9 during the beginning of the first revolution of the disc 506 since the head arrived at the target track 502. The read LBAs may be stored to a read buffer. The DSD may pause the read operation after the head passes LBA 9, or the DSD may continue reading the following sectors, even though they are not included in the LBA range 504. In either event, as the disc completes its first revolution 508, the read head may read the beginning of the LBA range 504, with LBAs 1 through 4. The entire LBA range 504 has been read once the head reaches LBA 5 again, in a single revolution of the disc. The read data may be reorganized into sequential order and transferred to the host device.

Figure 6:
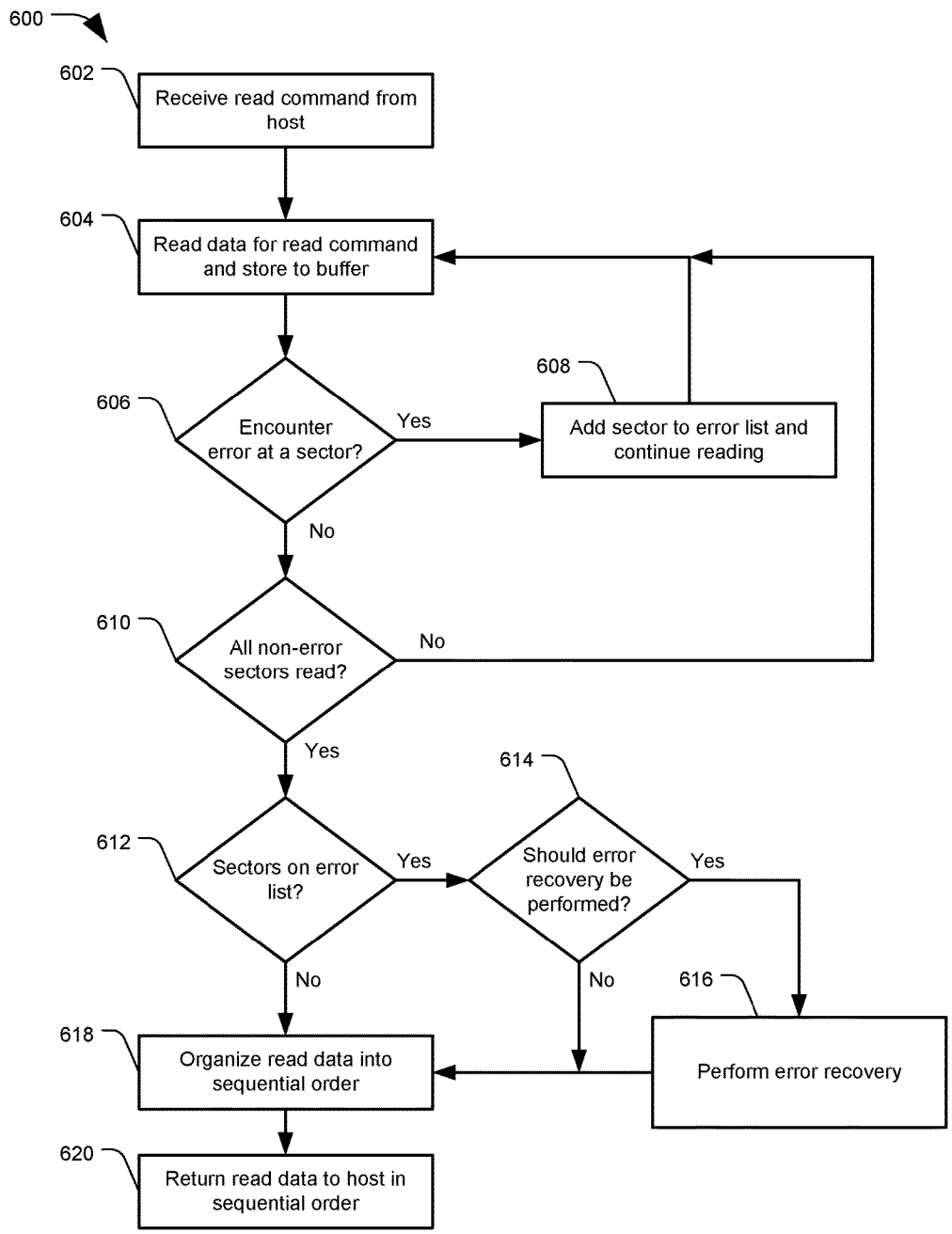
FIG. 6 is a flowchart of a method of out of order LBA processing, in accordance with certain embodiments of the present disclosure.

FIG. 6 is a flowchart of a method 600 of out of order LBA processing, in accordance with certain embodiments of the present disclosure. The method 600 may be performed by a data storage device, such as DSDs 104 and 200 of FIGS. 1 and 2, respectively.

Method 600 may include receiving a read command from a host device, at 602. In response, a DSD may begin reading the requested data and storing it to a read buffer, at 604. During the read operation, the method 600 may include determining whether an error has been encountered at each data sector, at 606. If an error has been encountered, the method 600 may include adding the sector to an error list and continuing the read operation without interruption, at 608 and 604.

If no error was encountered, at 606, the method 600 may include determining whether all sectors from the read command have been read, not including sectors added to the error list, at 610. If no, reading may continue at 604. If yes, method 600 may include determining whether any sectors have been added to the error list, at 612. If there are sectors on the error list, the method 600 may include determining whether error recovery should be performed on those sectors. For some applications, data access response time may be more important than full data retrieval. For example, for video streaming services, losing a frame or two of video may be preferable to slowing or stopping the video stream to attempt any error recovery. Accordingly, some DSDs may be configured to disregard a selected number of errors, or a selected percentage of marginal sectors for a given read command. In some embodiments, a host may indicate whether to ignore a number of errors, such as with an indicator in the read command.

If a determination is made to perform error recovery, at 614, the method 600 may include performing error recovery for the sectors on the error list, at 616. Error recovery may include performing a read retry operation for the marginal sectors, such as by generating a read mask to attempt reading only the sectors at which errors were encountered. Error recovery operations may also include reading parity data to attempt to reconstruct the data from the marginal sectors, such as by generating a read operation to read all of the sectors from the target data track minus the marginal sectors, and in some embodiments the data already read for the read command. In some embodiments, a DSD may attempt a read retry first, and attempt data reconstruction if the retry fails. In other embodiments, the DSD may skip retry attempts and immediately attempt data reconstruction. Data from the marginal sectors, whether successfully read or reconstructed, may be added to the read buffer.

Once error recovery has been performed, at 616, or a determination is made that error recovery should not be performed, at 614, or a determination is made that there are no sectors on the error list, at 612, the method 600 may include organizing the read data in the read buffer into sequential order, at 618. The read data may then be returned to the host in sequential order, at 620. Examples of error recovery operations are described in regard to FIGS. 7 and 8.

Figure 7:
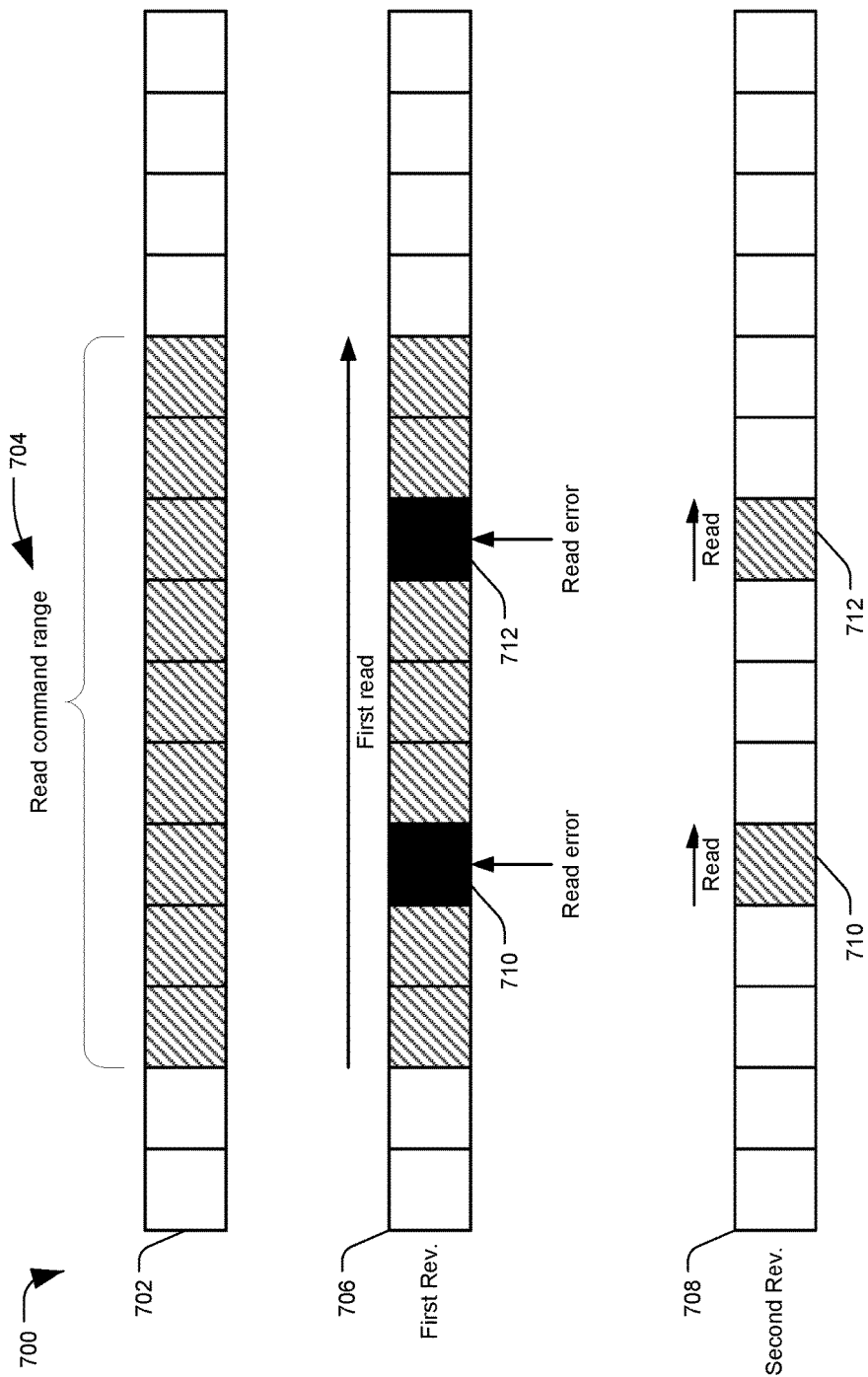
FIG. 7 is a diagram of storage sectors involved in a read command employing out of order LBA processing, in accordance with certain embodiments of the present disclosure.

FIG. 7 is a diagram 700 of storage sectors involved in a read command employing out of order LBA processing, in accordance with certain embodiments of the present disclosure. The diagram 700 may depict a section of a storage medium from a data storage device, such as the DSDs from FIGS. 1 and 2. Diagram 700 depicts a target data track 702 including an LBA range 704 requested in a read command. The track 702 includes a plurality of physical data storage sectors. A number of the sectors from target track 702 include data corresponding to the requested LBA range 704, depicted as sectors with hashing.

In the depicted example, the read head has reached the target track 702 prior the beginning of the LBA range 704. During a first revolution 706 of the disc memory, the read operation begins with the first sector of the LBA range. The read operation may encounter an error at sector 710, three sectors in to the LBA range 704. Rather than interrupting the read in an attempt to correct the error, the sector 710 may be added to an error list and the read may continue uninterrupted. The read operation may encounter a second error at sector 712. Again, the sector 712 may be added to an error list, and the read operation may continue uninterrupted until reaching the end of the LBA range 704. Data from the read sectors may be stored to a read buffer.

Upon completing the first read during the first disc revolution 706, the DSD may determine that there are sectors on the error list that should be recovered. The DSD may prepare a second read operation to read the two marginal sectors 710 and 712. The DSD may generate a read mask to limit the read operation to the two selected sectors. During a second disc revolution 708, the second read operation may be performed to attempt read retries on sectors 710 and 712. If the read retry is successful, the read data may be stored to the read buffer. If the read retry was not successful, additional retry attempts may be made (e.g. at different head offsets), which retries may use the same read mask on subsequent disc revolutions. The DSD may also attempt to reconstruct the data from the marginal sectors using parity data, as described in relation to FIG. 8.

Figure 8:
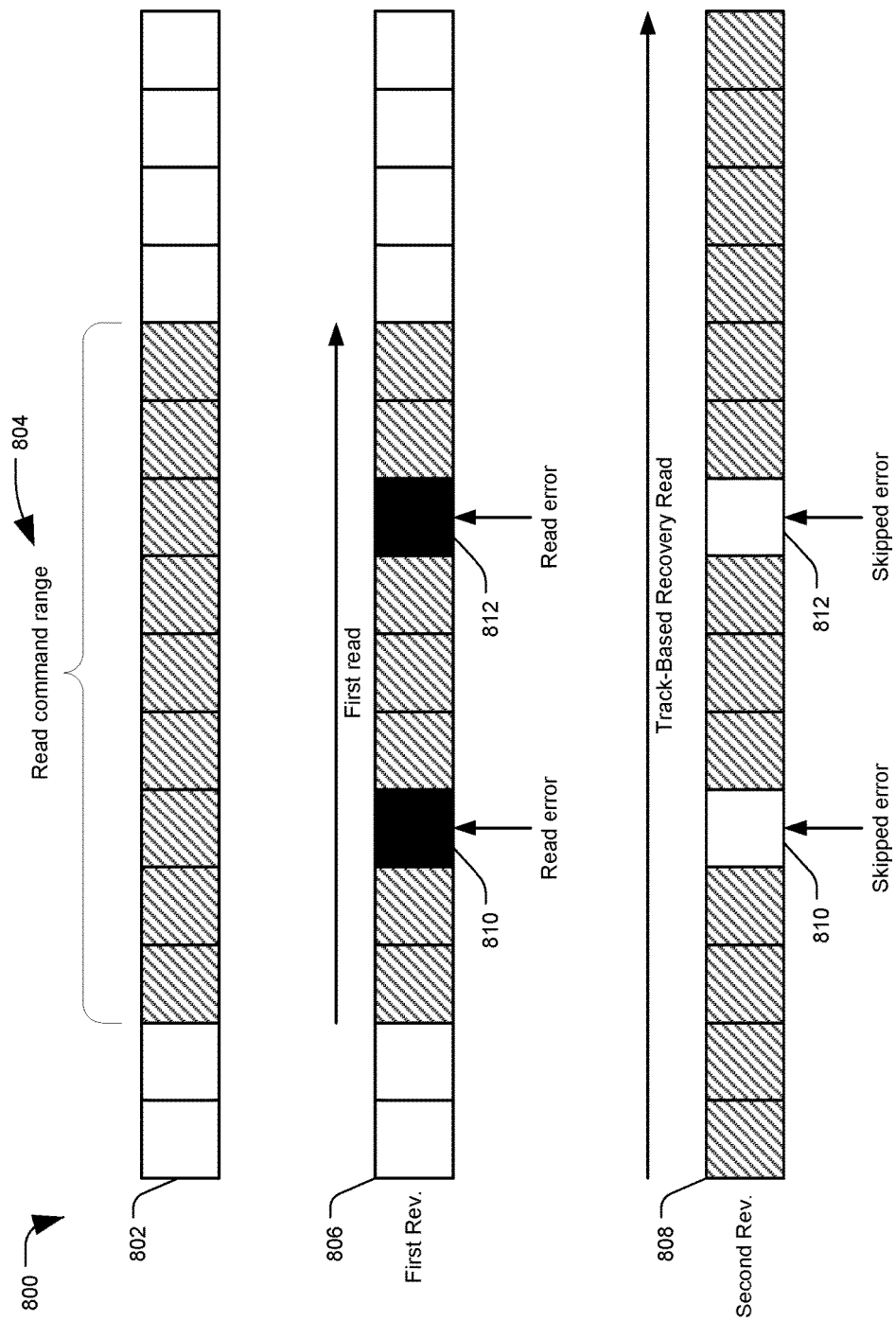
FIG. 8 is a diagram of storage sectors involved in a read command employing out of order LBA processing, in accordance with certain embodiments of the present disclosure.

FIG. 8 is a diagram 800 of storage sectors involved in a read command employing out of order LBA processing, in accordance with certain embodiments of the present disclosure. The diagram 800 may depict a section of a storage medium from a data storage device, such as the DSDs from FIGS. 1 and 2. Diagram 800 depicts a target data track 802 including an LBA range 804 requested in a read command. The track 802 includes a plurality of physical data storage sectors. A number of the sectors from target track 802 include data corresponding to the requested LBA range 804, depicted as sectors with hashing.

As described in relation to FIG. 7, a read operation may be performed during a first revolution 806 of a disc memory. Errors may be encountered at sectors 810 and 812 during the read operation, and indications of the sectors may be stored. In order to recover data for the marginal sectors 810 and 812, the DSD may execute a track-based recovery scheme during a second disc revolution 808. The track-based recovery may include recovering data for sectors on the target track 802 by reading parity data stored to sectors throughout the target track 802. With enough recovered parity data, the DSD may employ algorithms to reconstruct the data from marginal sectors 810 and 812. The DSD may generate a track-based recovery read operation configured to skip sectors 810 and 812 based on an error list from the first read. Data for both sectors 810 and 812 may therefore be reconstructed based on a single track-based recovery read operation.

In some implementations, track-based recovery may include reading data from the target track that was not requested in the read command. For example, the amount of sectors read in the track-based scheme may include more sectors than the data read operation requested, may include sectors other than sectors included in the read command, may be a larger number of sectors than were requested in the read command, etc. A track based recovery operation may include reading data from every sector of the target track less the marginal sectors. The DSD may be configured to skip sectors that were already read for the read command, e.g. during the first revolution 806. When skipping previously-read data, the DSD may combine parity data from the successfully read data from the first revolution 806 and parity data read during the track-based recovery read operation on the second revolution 808 to reconstruct the data for sectors 810 and 812. Other implementations are also possible.

Out of order LBA processing may also be used to simplify the organization of data on a disc storage medium. For example, discs in drives lacking out of order LBA processing may have data tracks configured with track skew. Track skew may refer to the start of data on one track being angularly (e.g. circumferentially) offset from the start of data on an adjacent track. For example, sector 1 of track 2 may be circumferentially offset by two sectors from sector 1 of track 1. When reading data in sequence from one track to the next, time may be required for the read head to move to the next track, during which time the disc continues to rotate. While the head is seeking between tracks, the first data sector of the second track may pass before the head can read it. Insufficient track skew can force the drive to wait almost an entire revolution for the beginning of the track to pass under the head again, resulting in extra revolutions per track to read the data. Track skew can add complexity to disc layout and formatting, as well as to device firmware and processing. However, in a drive configured with out of order LBA processing, data need not be read sequentially. Track skew may not be required to account for the travel time between tracks, as reading can resume regardless of whether the next sector to be read is the next sequential sector.

Another benefit of eliminating track skew may include an increased sequential data rate, sometimes called sequential transfer rate (STR). STR may refer to the rate at which data are read or written in sequential order, and can include instances of continuing to read from the last LBA of a first track to a next LBA on a next track. In some embodiments, STR may be based on a number of sectors per track relative to a drive's disc rotational speed. Drives including track skew may implement a fixed skew design between tracks, which may include a sequential data rate set based on the seek and setting requirements of most heads of a particular drive or class of drives. Drives including out of order LBA processing and no track skew can have a higher STR, and can begin reading earlier with most heads. The STR does not need to be reduced to accommodate the lesser performing heads.

The embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a processor configured to:
       coordinate read operations to a disc storage medium based on a location of a read head adjacent to the disc storage medium, the read head adjustable relative to a surface of the disc storage medium in order to access multiple data tracks of the disc storage medium;
       receive, from a host, a read command specifying a sequential logical block address (LBA) range from a first LBA to a last LBA, the LBA range corresponding to data stored in sequential LBA order to a set of physically sequential data sectors on a selected data track of the disc storage medium;
       read data from the data sectors in non-sequential order by reading an end of the LBA range before reading a beginning of the LBA range, including:
          determine an LBA X within the LBA range, the LBA X corresponding to a first readable sector that the read head will be able to read upon arriving at the selected data track during a seek operation from another data track;
          read data from the LBA X to the last LBA during a current revolution of the disc storage medium;
          read data from the first LBA to LBA X−1 during a next revolution of the disc storage medium when the read head reaches the first LBA;
       store the data to a buffer; and
       return the data to the host in sequential LBA order.

2. The apparatus of claim 1 further comprising:
    the processor configured to read the data sectors in non-sequential order, including:
       perform a first read operation including reading the data from the LBA range; and
       store indicators of data sectors corresponding to encountered read errors without interrupting the first read operation.

3. The apparatus of claim 2 further comprising:
    the processor configured to perform a second read operation based on the indicators from the first read operation, including:
       read parity data while skipping the data sectors corresponding to the indicators; and
       reconstruct data for the data sectors corresponding to the indicators based on the parity data.

4. The apparatus of claim 3 further comprising:
    the second read operation further including:
       read the parity data from a target track including the sequential LBA range, skipping data sectors read during the first read operation; and
       reconstruct the data for the data sectors corresponding to the indicators based on parity data read during the first read operation and parity data read during the second read operation.

5. The apparatus of claim 2 further comprising:
the processor configured to perform a second read operation based on the indicators from the first read operation, including:
generate a read mask based on the data sectors corresponding to the indicators; and
read data from only the data sectors corresponding to the indicators based on the read mask.

6. The apparatus of claim 2 comprising the processor further configured to:
determine whether to perform an error recovery operation to recover data from the data sectors corresponding to the encountered read errors;
when a determination is made to perform error recovery, perform a second read operation to recover data from the data sectors corresponding to the encountered errors; and
when a determination is made not to perform error recovery, do not return data from the data sectors corresponding to the encountered errors to the host.

7. A memory device storing instructions that, when executed, cause a processor to perform a method comprising:
coordinating read operations to a disc storage medium based on a location of a read head adjacent to the disc storage medium, the read head adjustable relative to a surface of the disc storage medium in order to access different data tracks of the disc storage medium;
receiving, from a host, a read command including a sequential logical block address (LBA) range from a first LBA to a last LBA, the LBA range corresponding to a set of physically sequential data sectors on a selected data track of the disc storage medium;
reading data from the data sectors in non-sequential order by reading an end of the LBA range before reading a beginning of the LBA range, including:
determining an LBA X within the LBA range, the LBA X corresponding to a first readable sector that the read head will be able to read upon arriving at the selected data track during a seek operation from another data track;
reading data from the LBA X to the last LBA during a current revolution of the disc storage medium;
reading data from the first LBA to LBA X−1 during a next revolution of the disc storage medium;
storing the data to a buffer; and
returning the data to the host in sequential LBA order.

8. The memory device of claim 7, the method further comprising:
reading the data sectors in non-sequential order, includes:
performing a first read operation including reading the data from the LBA range; and
storing indicators of data sectors corresponding to encountered read errors without interrupting the first read operation.

9. The memory device of claim 8, the method further comprising:
performing a second read operation based on the indicators from the first read operation, including:
reading parity data while skipping the data sectors corresponding to the indicators; and
reconstructing data for the data sectors corresponding to the indicators based on the parity data.

10. The memory device of claim 9, the method further comprising:
performing the second read operation further including:
reading the parity data from a target track including the sequential LBA range, skipping data sectors read during the first read operation; and
reconstructing the data for the data sectors corresponding to the indicators based on parity data read during the first read operation and parity data read during the second read operation.

11. The memory device of claim 8, the method further comprising:
performing a second read operation based on the indicators from the first read operation, including:
generating a read mask based on the data sectors corresponding to the indicators; and
reading data from only the data sectors corresponding to the indicators based on the read mask.

12. The memory device of claim 8, the method further comprising:
determining whether to perform an error recovery operation to recover data from the data sectors corresponding to the encountered read errors;
when a determination is made to perform error recovery, performing a second read operation to recover data from the data sectors corresponding to the encountered errors; and
when a determination is made not to perform error recovery, not returning data from the data sectors corresponding to the encountered errors to the host.

13. A method comprising:
coordinating read operations to a disc storage medium based on a location of a read head adjacent to the disc storage medium, the read head adjustable relative to a surface of the disc storage medium in order to access different data tracks of the disc storage medium;
receiving, from a host, a read command including a sequential logical block address (LBA) range from a first LBA to a last LBA, the LBA range corresponding to a set of physically sequential data sectors on a selected data track of the disc storage medium;
performing a first read operation to read data from the data sectors in non-sequential order by reading an end of the LBA range before reading a beginning of the LBA range, including:
determining an LBA X within the LBA range, the LBA X corresponding to a first readable sector that the read head will be able to read upon arriving at the selected data track during a seek operation from another data track;
reading data from the LBA X to the last LBA during a current revolution of the disc storage medium;
reading data from the first LBA to LBA X−1 during a next revolution of the disc storage medium;
storing the data to a buffer; and
returning the data to the host in sequential LBA order.

14. The method of claim 13 further comprising:
performing the first read operation further includes storing indicators of data sectors corresponding to encountered read errors without interrupting the first read operation;
performing a second read operation based on the indicators from the first read operation, including:
generating a read mask based on the data sectors corresponding to the indicators; and
reading data from only the data sectors corresponding to the indicators based on the read mask.

15. The method of claim 14 further comprising:
when the second read operation fails to read data from the data sectors corresponding to the indicators, performing a third read operation based on the indicators from the first read operation, including:
  reading parity data while skipping the data sectors corresponding to the indicators; and
  reconstructing data for the data sectors corresponding to the indicators based on the parity data.

16. The method of claim 15 further comprising:
performing the third read operation further including:
  retrieving parity data from the buffer corresponding to data read during the first read operation;
  reading the parity data from a target track including the sequential LBA range, skipping data sectors read during the first read operation; and
  reconstructing the data for the data sectors corresponding to the indicators based on parity data read during the first read operation and parity data read during the third read operation.

17. The method of claim 14 further comprising:
determining whether to perform an error recovery operation to recover data from the data sectors corresponding to the encountered read errors;
when a determination is made to perform error recovery, performing the second read operation to recover data from the data sectors corresponding to the encountered errors; and
when a determination is made not to perform error recovery, not returning data from the data sectors corresponding to the encountered errors to the host.

\* \* \* \* \*